United States Patent

Oschmann et al.

[11] Patent Number: 5,803,138
[45] Date of Patent: Sep. 8, 1998

[54] FILLING DEVICE FOR BATTERY CELLS WITH A FLOAT-OPERATED VALVE

[75] Inventors: Elke Oschmann, Mitterweg 9-11, Bergkirchen, Germany, 85230; Rainer Schmidt, Bergkirchen, Germany

[73] Assignees: Elke Oschmann; Anna Oschmann; Berta Oschmann, all of Bergkirchen, Germany

[21] Appl. No.: 737,961
[22] PCT Filed: Mar. 25, 1996
[86] PCT No.: PCT/EP96/01300
 § 371 Date: Dec. 24, 1996
 § 102(e) Date: Dec. 24, 1996
[87] PCT Pub. No.: WO96/30956
 PCT Pub. Date: Oct. 3, 1996

[30] Foreign Application Priority Data

Mar. 30, 1995 [DE] Germany ............ 195 11 803.0

[51] Int. Cl.$^6$ ........................................ B65B 1/04
[52] U.S. Cl. ............ 141/198; 141/95; 137/260; 429/73
[58] Field of Search ............ 141/198, 227, 141/228, 229, 95, 96; 137/260, 261, 440, 445, 430, 429, 442; 429/64, 73, 76, 77, 78, 79, 85, 91

[56] References Cited

U.S. PATENT DOCUMENTS

| 4,386,141 | 5/1983 | Weidner et al. | 141/198 |
| 4,696,874 | 9/1987 | Tadiello | 429/73 |
| 4,751,156 | 6/1988 | Olimpio | 137/260 |
| 5,309,937 | 5/1994 | Rover | 141/198 |

Primary Examiner—David J. Walczak
Assistant Examiner—Steven O. Douglas
Attorney, Agent, or Firm—Cohen, Pontani, Lieberman & Pavane

[57] ABSTRACT

A device that serves to automatically fill battery cells with water includes a filler plug that can be placed in the cell. The plug has two connection members for the water supply as well as a valve operated by a float. The valve body is connected in articulated fashion to the float, which is arranged centrally in the plug housing, via a pivotally mounted amplifying lever. Between the valve with the valve body and the connection member there is a substantially vertical overflow wall with a free upper edge that is higher than the horizontal upper edge of the bore of the connection members so that a U-shaped feed duct is formed that leads to the overflow wall.

12 Claims, 3 Drawing Sheets

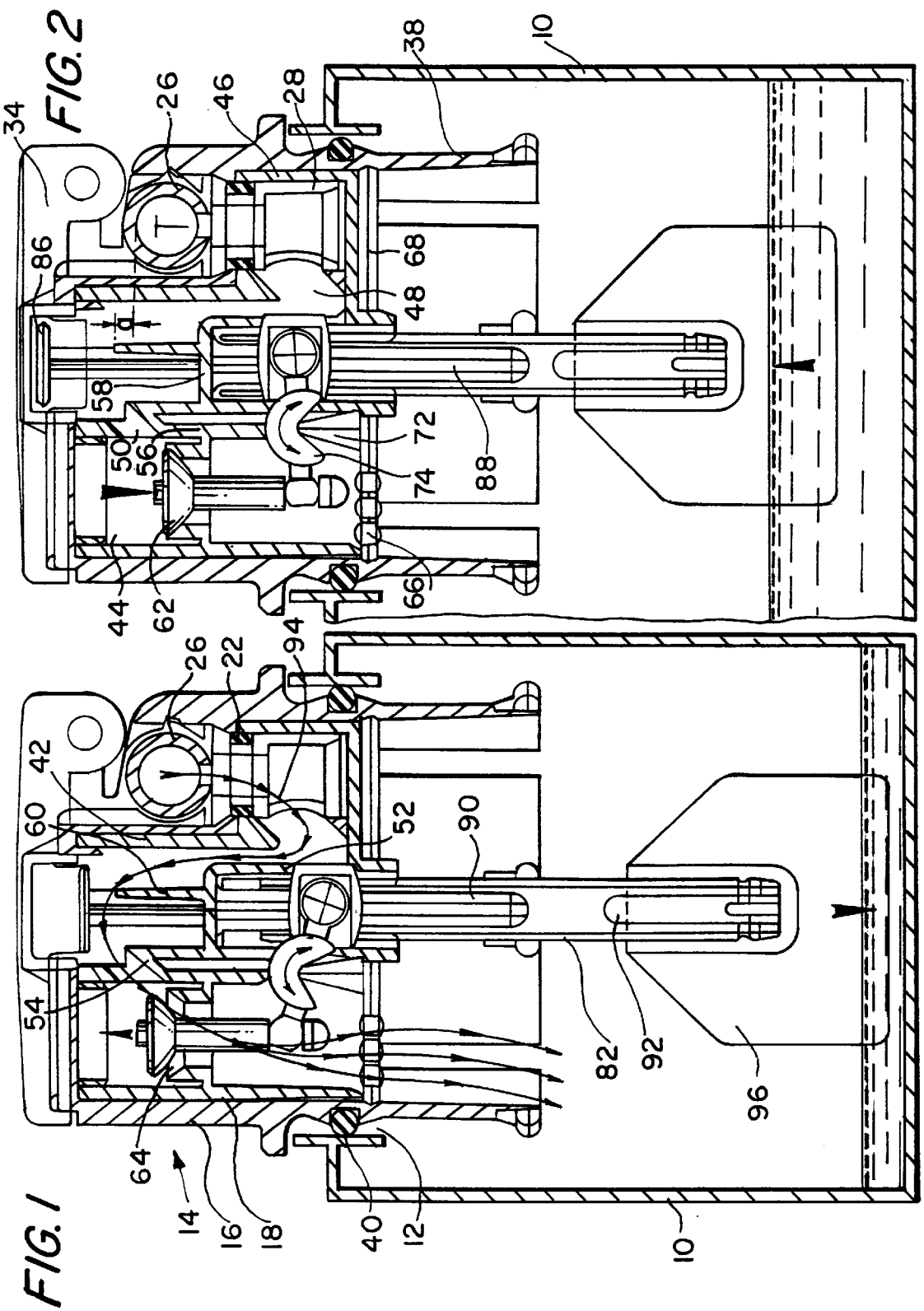

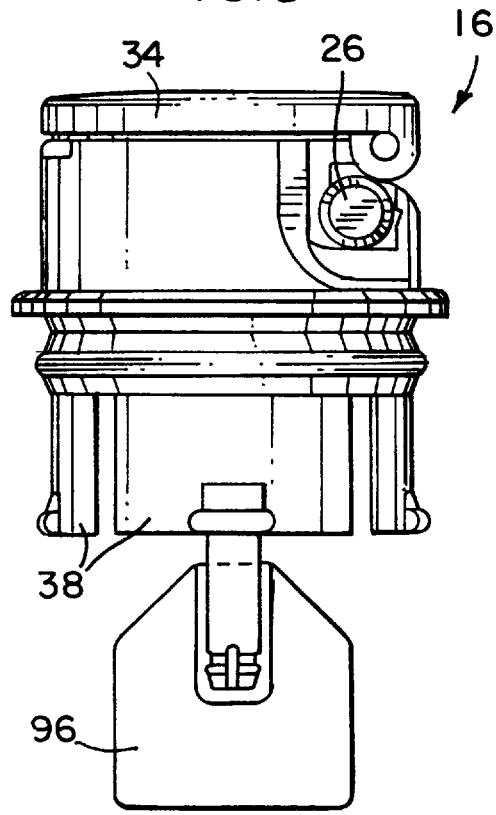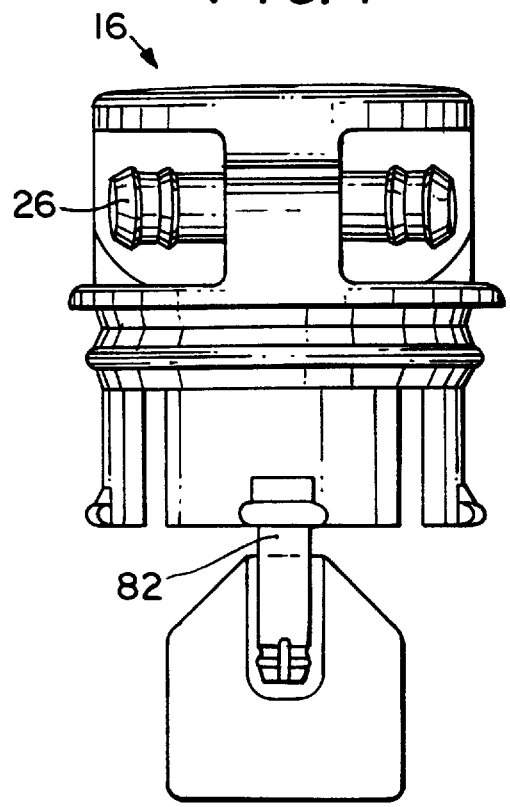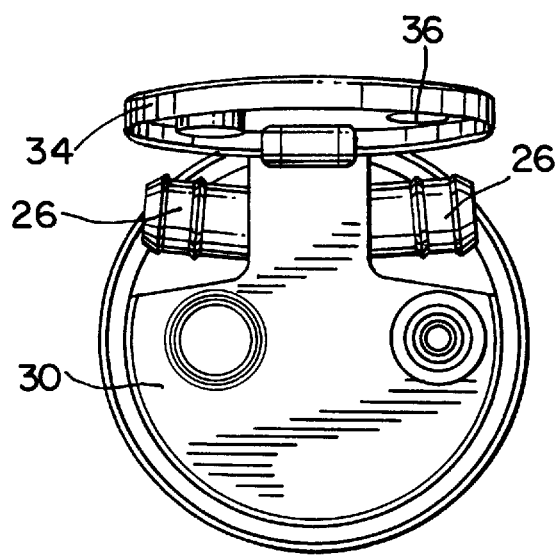

FILLING DEVICE FOR BATTERY CELLS WITH A FLOAT-OPERATED VALVE

BACKGROUND OF THE INVENTION

The invention relates to a device for automatically filling battery cells with water. The device having a filler plug that can be placed in the cell. The filler plug has a connection piece for the water supply as well as a float-operated valve. The valve body is connected in articulated fashion to the float, which is arranged in the center of the plug housing, by a pivotally mounted lever.

DESCRIPTION OF THE PRIOR ART

A device of this type is the subject matter of German reference DE-C 31 27 619. In this known filling device, the movements of the float are transmitted by an amplifying lever to a shaft with a prismatic cross-section. Upon being turned, the shaft operates a substantially horizontal valve body and brings the latter into the closed position when the fill level is reached. The supplied water runs into the battery cell through a central opening in the base of the plug housing and thereby ensures adequate lubrication of the float rod.

SUMMARY OF THE INVENTION

The object of the invention is to provide an improved filling device for battery cells that consists of as few individual parts as possible and is therefore easy to assemble. It is a further object to ensure that the supply lines connected to the connection pieces are as a rule always filled, in order to protect against hydrogen explosions and prevent the break-through to multiple plugs arranged one behind the other.

This object is attained according to the invention in a device of the type described above by arranging a substantially vertical overflow wall between the valve with the suspended body and the connection piece. The free upper edge of the overflow wall is higher than the horizontal upper edge of the bore of the connection piece, from which a U-shaped feed duct leads to the overflow wall.

The overflow wall, which is very high compared to previously known filling devices, forms a barrier, so that the water in the U-shaped feed duct always stands at the level of the upper edge of the bore of the connection piece. As a result, a siphon effect is created, which effectively prevents the feared break-through of hydrogen explosions. Because of the suspended arrangement of the valve body, a great deal of upward space is available, so that the overflow wall can extend very far upward.

In a further embodiment of the invention, the vertical U-leg that begins at the connection piece is formed by a cylinder closed on its lower side. From this cylinder, a lateral connecting duct opens into a parallel cylinder housing, in the upper region of which the overflow wall is embodied. To carry the water further, a supply duct leads laterally from the upper region of the cylinder housing into a valve cylinder that is parallel to the cylinder housing. In this valve cylinder is the seat for the suspended valve body. In this way, a forwarding duct in the form of an upside-down U is connected to the U-shaped feed duct.

In the base of the valve cylinder, there are feed openings, which lead laterally into the battery cell next to the float. The advantage of this is that incoming water does not strike the float from above, but instead flows into the battery cell laterally, so that there is no interference with the float movements that close the valve.

According to a further embodiment of the invention, the downwardly pointing end of the valve body is connected to the central float rod in articulated fashion by an amplifying lever, which is pivotally mounted on a tilt support.

It is especially advantageous for the tilt support and feed openings to be embodied on a substantially circular base plate that is connected in one piece to the cylinder housing by an articulation. The cylinder housing is embodied as a one-piece injection-molded inner housing with the valve cylinder and the cylinder accommodating the feed duct. This injection-molded housing can be easily manufactured (in one mold) and assembled, with the base plate being folded up toward the lower side of the inner housing and thereby sealing the latter on the bottom. Because the water supply ducts are molded along with the inner housing, no further measures are needed to seal the ducts at openings from which mold cores must be removed.

It is especially advantageous for the longer end of the amplifying lever to be connected in articulated fashion to an arm extending out horizontally from the float rod. Extending upward from the free end of the arm is a vertical rod that carries a display disk which, when the valve is closed, is visible through a window in a lid in the plug housing. These measures transmit the vertical float movement to the valve body via the amplifying lever and, at the same time, transmit the vertical float movement directly to the display disk. It is therefore possible to perform a visual check to determine if the valve is in the closed state.

According to an especially advantageous further embodiment of the invention, the float rod is hollow and its upper end engages in a guide cylinder. This guide cylinder, which is closed at the top, is embodied in the central cylinder housing. Extending downward from the lid of the guide cylinder is a guide pin that engages in the upper end of the hollow float rod. It is advantageous for the guide pin to have a cruciform cross-section such that vertical run-off slots are formed on its longitudinal sides. The lower end of the float rod, which can be placed in the float with snap seating, has a lateral run-off opening over the float.

The described measures ensure that the float rod is easy to guide at all times and is protected to a great extent against the influences of outside particles by the telescopic guide on the guide pin and by the mounting in the guide cylinder closed at the top. Because of the rough conditions under which battery cells are operated at given sites, the penetration of dirt and, in particular, oily particles into the cells is unavoidable and can, in previously known filling devices, impede the movement of the float rod. This danger is largely excluded in the present invention; first of all, because any dirt particles present are pressed out from the float rod area through the vertical run-off slots and lateral run-off openings by the vertical pumping movement of the float rod and secondly, because the hollow float rod is always filled with particles of free distillate, ensuring good lubrication.

In manufacturing the filling device, it is advantageous for a vertical connector that leads to the connection piece to engage in the cylinder accommodating the feed duct. The vertical connector is embodied in one piece with the plug housing. Extending downward from the horizontal upper side of the plug housing, to which a lid is attached in articulated fashion, are radially elastic side walls that can be placed in the battery cell. When the plug housing is placed on the injection-molded inner housing, the vertical U-leg of the feed duct, which begins at the connection piece, is completed. At the same time, a snap connection is established between the injection-molded inner housing and the elastic side walls of the plug housing.

For easy assembly and removal of connecting tubes, it is advantageous for two connection pieces to be provided on the plug housing, the axes of which form an obtuse angle, making the connection pieces more easily accessible.

BRIEF DESCRIPTION OF THE DRAWINGS

The invention is described below in reference to an example shown in the drawings. The drawings show:

FIG. 1 is a cross-section of a filling device according to the invention in a battery cell during the filling process;

FIG. 2 shows the filling device as in FIG. 1, when the valve is closed;

FIG. 3 is a side view of the filling device;

FIG. 4 is a side view turned by 90° relative to FIG. 3;

FIG. 5 is a top view of the filling device when the lid is open;

DETAILED DESCRIPTION OF THE PREFERRED EMBODIMENTS

Figure 6:
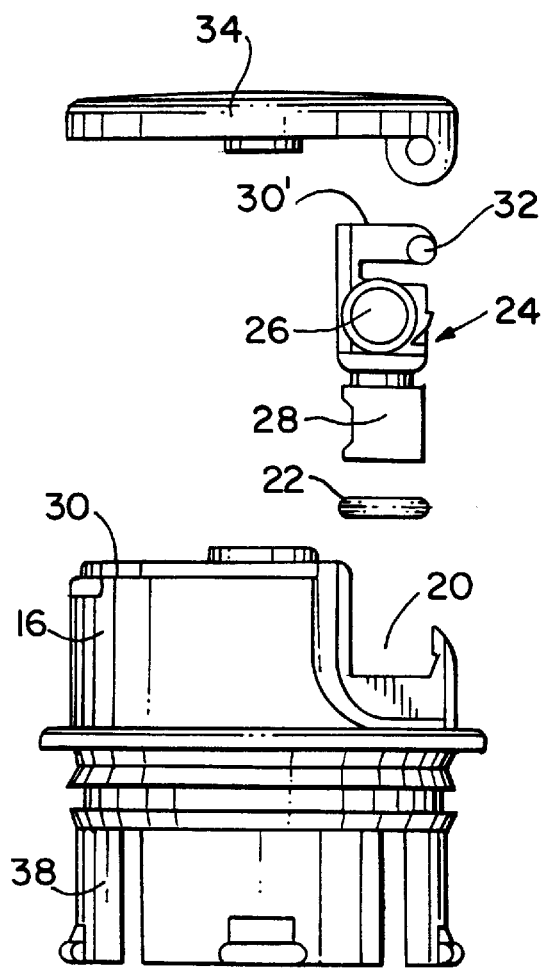
FIG. 6 is an exploded view of the plug housing.

FIGS. 1 and 2 show two adjacent battery cells 10, in the upper openings 12 of which are placed the respective filling devices 14 according to the invention. Each filling device 14 consists of an outer cylindrical plug housing 16 (FIG. 6) of plastic and an inner housing 18 FIG. 7) placed therein. The inner housing 18 is produced substantially in one piece as an injection-molded part.

As FIG. 6 shows, a T-shaped connection piece 24 is placed in a lateral seat 20 of the plug housing 16, with interconnection of an O-ring 22. The T-shaped connection piece 24 consists of two horizontal connection members 26 and a connector 28 that extends downward from the center of the latter. FIG. 5 shows that the two connection members 26 together form an obtuse angle, which facilitates the connection of tube lines.

When the plug housing 16 is in the assembled state, its horizontal upper side 30 is located on the same plane as the horizontal upper side 30' of the connection piece 24. Extending out from the upper side 30' toward both sides are two pins 32, which serve as articulated bearings for a lid 34, into which a circular window 36 is laterally worked.

Extending downward from the upper side 30 of the plug housing 16 are radially elastic side walls 38. With interconnection of an O-ring 40, these side walls 38 are placed with snap seating in the upper opening 12 of the given battery cell 10.

Figure 7:
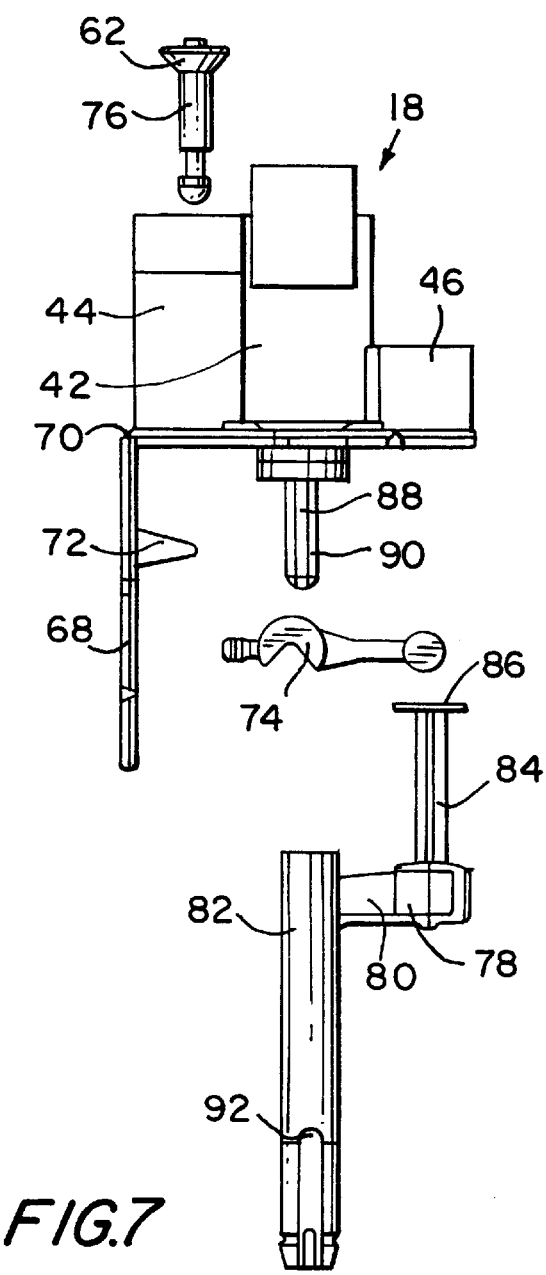
FIG. 7 is an exploded view of the injection-molded inner housing with the elements mounted therein.

Between the radially elastic side walls 38 of the plug housing 16, the injection-molded inner housing 18 is placed with snap engagement. The injection-molded inner housing 18 has in its center a vertical cylinder housing 42, on the left side wall of which a parallel valve cylinder 44 is molded in one piece (FIG. 7). On the opposite side of the cylinder housing 42, another axis-parallel cylinder 46 is formed. The lower side of this cylinder 46 is closed and its upper side is open, so that when the filling device 14 is in the assembled state, the downwardly pointing connector 28 of the connection piece 24 engages in the cylinder 46.

From the connector 28 and thus from the cylinder 46, a lateral connecting duct 48 leads to the central cylinder housing 42, which is connected in its upper region to the valve cylinder 44 via a lateral overflow duct 50.

In the center of the cylinder housing 42 is a guide cylinder 52, which is formed on the connecting wall 56 between the cylinder housing 42 and the valve cylinder 44 via a stem 54. The guide cylinder 42 is closed on its upper side by a lid 58, from which a vertical overflow wall 60 extends upwardly. The upper free edge of the overflow wall 60 is higher by a distance α than the horizontal upper edge of the bore of the two connection pieces 26. As shown in FIG. 1, a U-shaped feed duct 94 is thus formed, which acts as a siphon and ensures that the connection pieces 26 are always filled with water.

FIG. 1 also shows that behind the overflow wall 60, water flows through the overflow duct 50 under the valve body 62 of the open valve. Because of the downward movement of the float 96 when the battery cell 10 is insufficiently filled, the valve is lifted up from the valve seat 64 in the valve cylinder 44. In the valve cylinder 44, the supplied water flows through feed openings 66 laterally next to the float 96 downward into the battery cell 10.

The feed openings 66 are worked into a substantially circular base plate 68, which is embodied according to FIG. 7 via an articulation 70 in one piece with the cylinder housing 42. When the filling device 14 is assembled, the base plate 68 is swung upward around the articulation 70 out of the position shown in FIG. 7 until coming to rest on the lower side of the inner housing 18 and sealing the latter on the bottom.

Extending out from the upper side of the base plate 68 is a tilt support 72, on which a two-armed lever 74 is pivotally mounted. The shorter end of the lever 74 engages in articulated fashion in a recess in the shaft 76 of the suspended installed valve body 62. The free end of the longer arm of the lever 74 engages in articulated fashion in a recess 78 in an arm 80, which extends out horizontally from a hollow float rod 82. The length ratio of the arms of the lever 74 in the illustrated embodiment is 1:2.4, so that the float force is converted into a correspondingly larger closing force of the valve body 62.

Extending upwardly from the free end of the arm 80 is a vertical rod 84, which carries a display disk 86. The display disk 86 is visible when the valve is closed through the window 36 in the lid 34 of the plug housing 16. This is illustrated in FIG. 2.

Extending out downward from the inner side of the lid 58 of the guide cylinder 52 is a guide pin 88, which engages in the upper end of the hollow float rod 82. The guide pin 88 has a cruciform cross-section, so that four vertical run-off slots 90 are formed on its longitudinal sides. The lower end of the float rod 82 is placed in the float 96 with a snap seating and has lateral run-off openings 92 above the float 96.

The described hollow design of the float rod 82 and its telescopic guide on the guide pin 88 provides the advantage of continuous sufficient water lubrication and self-cleaning of the often unavoidable floating and contaminating particles. When the filling device 14 is in use, the float 96 moves continuously, due to the ever fluctuating water level, so that a pumping movement occurs between the guide pin 88 and the hollow float rod 82, which is filled with distillate at all times due to the capillary effect. The pumping movement results in lubrication and also ensures that any particles that have entered the hollow float rod 82 are pressed downward and expelled through the run-off openings 92.

The above description of the invention indicates that an extremely effective assembly with few individual parts is housed in a very small space.

I claim:

1. A device for automatically filling a battery cell with water, comprising: a plug housing; a connection piece having a bore and being connected to the plug housing to provide a water inlet; a float-operated valve means including a float arranged centrally in the plug housing, a suspended valve body, and a pivotally mounted lever arranged to connect the valve body to the float in an articulated manner; a substantially vertical overflow wall arranged between the valve means with the suspended valve body and the connection piece, the overflow wall having a free upper edge that is higher than a horizontal upper edge of the bore of the connection piece so as to form a U-shaped feed passage that leads to the overflow wall; a cylinder housing centrally arranged in the plug housing; and a cylinder arranged parallel to the cylinder housing so as to form a leg of the U-shaped passage, the cylinder having a closed lower end, a lateral connecting duct being arranged to place the cylinder in fluid communication with the cylinder housing, the cylinder housing having an upper region at which the overflow wall is arranged.

2. A device as defined in claim 1, and further comprising a valve cylinder parallel to the cylinder housing and a lateral overflow duct arranged to place the upper region of the cylinder housing in fluid communication with the valve cylinder, the valve body having a valve seat arranged in the valve cylinder.

3. A device as defined in claim 2, wherein the valve cylinder has a base in which feed openings are provided so as to lead into the battery cell laterally next to the float.

4. A device as defined in claim 3, wherein the float has a rod, the valve body has a shaft with a downwardly directed end connected in articulated fashion to the float rod by the lever, and further comprising a tilt support adjacent the cylinder housing so as to pivotally support the lever.

5. A device as defined in claim 4, and further comprising a substantially circular base plate on which the tilt support is arranged and in which the feed openings are provided, and an articulation arranged to connect the base plate to the cylinder housing, the valve cylinder, the cylinder, the articulation, the base plate and the cylinder housing being formed as a one-piece injection molded inner housing that accommodates the feed passage.

6. A device as defined in claim 5, and further comprising a vertical connector arranged to lead to the connection piece and formed as a single piece with the plug housing, the connection piece having a horizontal upper side, a lid being attached to the upper side of the connection piece, the plug housing having downwardly extending radially elastic side walls configured to be insertable in the battery cell, the vertical connector being configured to engage in the cylinder.

7. A device as defined in claim 6, wherein two connection pieces are connected to the plug housing so as to have axes that form an obtuse angle.

8. A device as defined in claim 6, wherein the injection-molded inner housing is configured to be arranged between the side walls of the plug housing with snap engagement.

9. A device as defined in claim 4 and further comprising a lid mounted on the plug housing, the lid having a window, wherein the lever is an amplifying lever having a longer end, an arm extending out horizontally from the float and connected in articulated fashion to the longer end of the lever, the arm having a free end from which a vertical rod extends, and a display disk being mounted on the vertical rod so as to be visible when the valve means is closed through the window in the lid of the plug housing.

10. A device as defined in claim 4, and further comprising a guide cylinder having a closed top and arranged in the cylinder housing, the float rod being hollow and having an upper end that engages in the guide cylinder, the guide cylinder having a lid with a downwardly extending guide pin that engages in the upper end of the hollow float rod.

11. A device as defined in claim 10, wherein the guide pin has a cruciform cross-section so as to form longitudinal sides with vertical run-off slots.

12. A device as defined in claim 10, wherein a lower end of the float rod is configured to engage with a snap seat in the float and has a lateral run-off opening over the float.

* * * * *